United States Patent
Zettler et al.

(10) Patent No.: US 12,351,401 B2
(45) Date of Patent: Jul. 8, 2025

(54) COMPUTER-IMPLEMENTED METHOD, APPARATUS FOR DATA PROCESSING, AND COMPUTER SYSTEM FOR CONTROLLING A CONTROL DEVICE OF A CONVEYOR SYSTEM

(71) Applicant: Körber Supply Chain Logistics GmbH, Constance (DE)

(72) Inventors: Michael Zettler, Allensbach (DE); Marc Christian Weber, Munich (DE); Daniel Hein, Munich (DE); Clemens Otte, Munich (DE); Martin Schall, Constance (DE); Frank Pfeiffer, Munich (DE)

(73) Assignee: KÖRBER SUPPLY CHAIN LOGISTICS GMBH, Constance (DE)

( * ) Notice: Subject to any disclaimer, the term of this patent is extended or adjusted under 35 U.S.C. 154(b) by 137 days.

(21) Appl. No.: 18/548,293

(22) PCT Filed: Feb. 1, 2022

(86) PCT No.: PCT/EP2022/052335
§ 371 (c)(1),
(2) Date: Aug. 29, 2023

(87) PCT Pub. No.: WO2022/184358
PCT Pub. Date: Sep. 9, 2022

(65) Prior Publication Data
US 2024/0140724 A1    May 2, 2024

(30) Foreign Application Priority Data
Mar. 1, 2021 (EP) .................. 21159819

(51) Int. Cl.
*B65G 43/08* (2006.01)
*B65G 43/10* (2006.01)
*G05B 19/418* (2006.01)

(52) U.S. Cl.
CPC ............ *B65G 43/08* (2013.01); *B65G 43/10* (2013.01); *G05B 19/4189* (2013.01)

(58) Field of Classification Search
CPC ..... B65G 43/08; B65G 43/10; G05B 19/4189
(Continued)

(56) References Cited

U.S. PATENT DOCUMENTS

2016/0239000 A1    8/2016    Yan et al.
2020/0043764 A1*   2/2020    Clark ................ H01L 22/12
(Continued)

FOREIGN PATENT DOCUMENTS

| EP | 3153242 A2 | 4/2017 |
|---|---|---|
| EP | 3287396 A1 | 2/2018 |
| EP | 3715287 A1 | 9/2020 |

OTHER PUBLICATIONS

European Patent Office; International Search Report; May 13, 2022; entire document.

*Primary Examiner* — Gene O Crawford
*Assistant Examiner* — Lester Rushin, III
(74) *Attorney, Agent, or Firm* — Price Heneveld LLP

(57) ABSTRACT

A computer-implemented method, a device for data processing and a computer system for controlling a control device of a conveyor system to achieve an alignment and/or a defined spacing of piece goods, wherein the control of the control device is determined by an agent acting according to Reinforcement Learning methods. An individual, local state vector of predefined dimension that is the same for all the piece goods is created for each of the piece goods and an action vector is selected from an action space according to
(Continued)

a strategy that is the same for all piece goods for the current state vector of this piece good. These action vectors are projected onto the conveying elements, wherein conflicts are resolved. After a cycle time has elapsed, state vectors are created again for each piece good and evaluated with rewards and the strategy is adjusted.

19 Claims, 4 Drawing Sheets

(58) Field of Classification Search
USPC .......................................................... 198/358
See application file for complete search history.

(56) References Cited

U.S. PATENT DOCUMENTS

| | | | |
|---|---|---|---|
| 2022/0027529 A1* | 1/2022 | Zarur | G06F 30/12 |
| 2022/0105629 A1* | 4/2022 | Natarajan | G05B 19/4189 |
| 2023/0174316 A1* | 6/2023 | Shenoy | B65G 43/10 |
| | | | 700/230 |

* cited by examiner

COMPUTER-IMPLEMENTED METHOD, APPARATUS FOR DATA PROCESSING, AND COMPUTER SYSTEM FOR CONTROLLING A CONTROL DEVICE OF A CONVEYOR SYSTEM

BACKGROUND

The present invention relates to the technical field of conveying systems for piece goods, and in particular to conveying systems suitable for singulating (singulation) and/or orienting the piece goods.

In the logistics sector, singulators are used to separate an incoming stream of many disordered piece goods, in particular mail items such as packages and parcels or pieces of luggage, i.e. to create a defined distance between individual packages, and often also to ensure a specific orientation of the piece goods. This is necessary in order to be able to process the piece goods in downstream process steps, e.g. for scanning addresses. Another objective is to maximize throughput (packages/hour) while maintaining a specific control quality (spacing and alignment) and possibly other constraints such as reduction of power consumption and wear.

Singulators exist with parallel conveyor sections, each of which has a plurality of conveyor elements arranged one behind the other, in which the position and orientation of the piece goods is monitored by sensors (e.g. cameras). A singulator is controlled by a control device. Piece goods, which are fed onto the singulator as a disordered flow of piece goods, are to be transported by the conveyor elements and meanwhile separated and aligned into defined distances. The conveyor belts of all conveying elements can be controlled separately, with the set values for the velocities being specified by a control. The control processes are set under test conditions, prior to installation at the end customer, using a standard flow of goods with a certain fixed distribution of piece goods properties. Depending on the current arrangement of the piece goods on the conveyor system, as captured by the sensors, the individual control of the conveying velocities of all conveying elements, predetermined for this arrangement, is selected by the control device and the conveying elements are controlled accordingly, i.e. the conveying elements are accelerated and decelerated differently. The optimal, manual, or manual-assisted adjustment of these control processes is very time-consuming, because in order to achieve efficient singulation and arrangement, the velocities of the conveying elements have to be readjusted at a very high rate (e.g. 30 ms).

In addition, this presetting of the control processes is only very efficient and reliable for separation and alignment if the piece goods actually transported on the conveyor system have similar properties (weight distribution, friction properties, size, shape, material, . . . ) as the standard goods used for the presetting. However, if the range of goods has different properties than the standard goods (e.g. more smooth, slippery plastic packages instead of grippy cardboard packages or packages), the piece goods will not react to a change of the parameters like the standard goods. These properties are not necessarily directly observable in the camera image, but they do influence the dynamics, e.g. by a changed dead time in case of velocity changes. Adjustments to customer-specific situations after commissioning are difficult, especially if the properties of the piece good flow at the respective customer still change over time after commissioning of the system.

So far, the problem has been solved by a combination of classical image processing and manual controller design, i.e. a detection of the packages in the camera image, transfer to an internal representation (e.g. polygons) and manual design of a suitable controller, e.g. a PID controller assuming a certain expected statistical distribution of the package stream. Usually, simulations are also used to help. Often the problem is simplified by having the controller focus on the foremost package of a piece good stream at any given time and disregard other packages initially, but this can reduce the control performance.

SUMMARY

Due to the high number of conveying elements, the control is complex in terms of control technology, because the dimensionality of this control problem corresponds to the number of conveying elements of the conveying system. The adaptation of the control processes based on already set singulators to further singulators with different number and length of conveying elements is complex. The combination of high cycle rate and high dimensionality does not allow for normal machine learning methods that can adjust to the actual flow of piece goods.

The present invention is therefore based on the object of providing a method and an apparatus which offer an improvement over the prior art. This object is solved by the solutions described in the independent claims. Advantageous embodiments result from the dependent claims.

The solution according to the invention provides a computer-implemented method for controlling a control device of a conveyor system for transporting piece goods of at least one type, in particular mail items and baggage items. The conveyor system has a plurality of conveyor elements aligned along and parallel to a conveying direction, the conveyor elements are driven under control of the control device by a respectively assigned drive with individually adjustable velocity in order to achieve an alignment and/or a defined spacing of the piece goods. The control of the control device is determined by at least one agent acting or predetermined according to Reinforcement Learning methods (Reinforcement Learning), which according to a strategy situationally selects an action from an action space for an initial state in order to reach a subsequent state, wherein the states can be represented with state vectors and the actions with action vectors. The method comprises the method steps:

a) Creating an output image of the conveyor system.

b) For each of the piece goods on the image, individual creation of a state vector of predefined, thus predetermined, and for all piece goods of a type of the same dimension, comprising state information of the respective piece good taken from the immediately previously created image (initial or subsequent image).

c) Selecting an action vector from an action space individually for each piece good according to the same strategy (policy) for all piece goods of one type for the current state vector of this piece good, wherein the dimension of the action vector is predetermined.

d) For each piece good, mapping the action vector to the real conveying elements of this piece good in order to determine the velocity of these conveying elements, and corresponding control of the conveying elements, i.e. an adjustment of the velocity of the drives of these conveying elements, with the control device.

e) Creating a subsequent image after a cycle time has elapsed of the conveyor system and carrying out process step b) in order to obtain a state vector of the subsequent state (subsequent state vector) for each piece good.

f) If the strategy for piece goods (4) of one type is to be trained further during the execution of the method, the state vector of the subsequent state is evaluated for each piece good of this kind by a method of Reinforcement Learning on the basis of a reward, whereupon the agent trains and thus optimizes its strategy for piece goods (4) of this kind by adjusting the action vectors of the action space.

g) For each piece good, steps c)-f) are performed again using the improved or predetermined strategy as long as the piece good in question is shown on the subsequent image. The procedure is also carried out for new piece goods appearing on the image.

The solution according to the invention relates to a device for data processing for computer-implemented control of a control device of a conveyor system for transporting piece goods of at least one type, in particular mail items and baggage items. The conveyor system has a plurality of conveyor elements aligned along and parallel to a conveying direction, wherein the conveyor elements are driven under control of the control device by a respective associated drive with individually adjustable velocity in order to achieve an alignment and/or a defined spacing of the piece goods. The control of the control device is determined by at least one agent acting according to methods of Reinforcement Learning, which according to a strategy for piece goods of one type situationally selects an action from an action space for an initial state in order to reach a subsequent state, wherein the states can be represented with state vectors and the actions with action vectors, wherein the piece goods on the conveyor system can be detected by at least one sensor, and the control device comprises a computing unit. The device comprises means for carrying out the method according to the invention.

The solution according to the invention also relates to a conveyor system for transporting piece goods of at least one type, in particular mail items and baggage items, which has a plurality of conveyor elements aligned along and parallel to a conveying direction. The conveying elements are driven under control of a control device by a respective associated drive with individually adjustable velocity in order to achieve an alignment and/or a defined spacing of the piece goods. The control of the control device is determined by at least one agent acting according to methods of Reinforcement Learning which, according to a strategy which is the same for all piece goods of one type, situationally selects an action from an action space for an initial state in order to reach a subsequent state, wherein the states can be represented with state vectors and the actions with action vectors, comprising a device according to the invention.

The solution according to the invention also relates to a computer program comprising instructions which, when executed by a computing unit connected to a conveyor system according to the invention, cause the latter to execute the method according to the invention.

The device, the conveyor system, and the computer program have, to the extent transferable, the same advantages listed with respect to the process presented.

Thus, process features are also to be seen objectively formulated as a property of the corresponding device unit and vice versa.

Applying a method of Reinforcement Learning simultaneously to all piece goods (of one type) and all conveying elements of a conveyor system is a high-dimensional problem, because for each cycle time a velocity must be determined individually for each conveying element. Above a certain number of conveying elements, this cannot be solved within the cycle time typical in conveying systems such as singulators (e.g. 30 ms). By decomposing the control problem of all conveying elements into local action vectors of a piece goods, the dimensionality is reduced so much that a computing unit is able to apply a method of Reinforcement Learning within the required cycle time to this variety of low dimensional and thus less complex problems. By pre-determining the dimension of the state vectors of all the piece goods, the dimension of each state vector is predetermined and the dimension of the state vectors of all the piece goods coincides. In addition, the dimension of the action vectors is less than the number of conveying elements of the conveying system after a certain number of conveying elements. The action vector represents the available motor power of the conveying elements, and no change is made if a piece good is already perfectly aligned and at a desired distance from the adjacent piece goods. In this case, the action vectors can be preassigned according to a design with default values of the conveyor system. Moreover, the agent (of each piece goods type) receives not only one reward for each cycle time, but for each cycle time as many rewards as there are piece goods of one type to be singulated on the conveyor elements. The number of piece goods and the number of types of piece goods does not change the principle of the process. The agent therefore learns more quickly, since with just one pass the strategy is trained not just once, but according to the number of piece goods and is thus optimized more quickly. This allows the process to adapt particularly quickly to a changing flow of piece goods.

By setting the velocity, a conveyor element is accelerated or decelerated via its drive, causing the conveyor elements to change the orientation and position of the piece goods resting on them. Before starting the process, default values can be assigned to all conveying elements of the piece goods. The images are obtained via a camera image (image sensor) and/or via other sensors for determining the position and orientation of the piece goods and converted into an image that can be described by state vectors.

According to one embodiment, the piece goods on the image can be assigned to a first and at least one further type depending on the properties of the piece goods, and an agent with a strategy for piece goods of this kind can be provided for each assigned type. If the same strategy is used for all piece goods on the image, all piece goods belong to one type and no assignment of the piece goods follows. However, if easily distinguishable types of piece goods (e.g. cardboard packages as piece goods of the first type and plastic bag packages as piece goods of the second type; rigid suitcases as piece goods of the first type and flexible travel bags as piece goods of the second type; . . . ) are transported on the same conveyor system, these piece goods have different adhesion and friction properties. Even with the same initial state (same orientation, same contact surface on the same conveying elements), these piece goods react differently to a control of the conveying elements selected according to the action vectors, i.e. even with identical control of those conveying elements on which they rest, they reach a different subsequent state. This subsequent state will not differ greatly, but it may still be useful to use different strategies for these different types of piece goods. The conveyor system can determine the type of piece goods, e.g. on the basis of the illustration, and then assign a separate strategy to each assigned piece good type, i.e. strategy one for cardboard packages and strategy two for plastic bag packages as well as any further strategies for other piece good types.

According to one embodiment, for each cycle time and for each piece good, the velocities of those conveying elements, on which the piece good rests but to which no action vector of this piece good has been mapped, can be determined and these conveying elements can be controlled individually with the control device. The velocities can be determined by interpolation of the velocities of those adjacent conveying elements to which an action vector of this piece goods has been mapped. This solves the problem that the dimensionality of the action vector does not necessarily correspond to the number of conveyor elements on which the piece goods rest. For this interpolation task, e.g. bilinear interpolation is suitable.

According to one embodiment, for each cycle time, i.e. always simultaneously with the determination of the velocities of the action conveying elements, the velocities of all those conveying elements can be determined on which both no piece goods are lying and on which no action vector of a piece goods has been mapped, and corresponding individual control of these conveying elements with the control device. The velocities can be determined by interpolation, e.g. bilinear interpolation, of the velocities of those adjacent conveying elements to which an action vector of a piece good has been mapped. Special boundary conditions can be assumed for edge conveying elements. Additionally or alternatively, the velocities can be determined using velocity parameters of the conveyor system. These can be standard values from installation or simulation, e.g. mean value of all action vector conveyor elements. Additionally or alternatively, the velocities of conveyor elements on whose adjacent conveyor elements the action vector of a piece good has been mapped can be selected to match the velocity of that adjacent conveyor element. Additionally or alternatively, the velocities for some or all of these conveying elements may be identical and determined from the mean value of the velocities of the conveying elements onto which an action vector of a piece goods has been mapped. By driving even those conveying elements on which no piece goods are lying at this moment, these do not have to be accelerated from zero if a velocity of the action vector is mapped onto them in the next cycle time. It also makes sense to drive these conveying elements because a piece good can be transported onto one or more of these conveying elements during the cycle time.

According to one embodiment, the state information of a piece good mapped in the state vector may include position and/or orientation.

According to one embodiment, the state information mapped in the state vector or otherwise mapped state information of a piece good may further comprise overlap of the piece good with those conveyor elements on which the piece good rests and/or state information of a predetermined number of nearest adjacent piece goods within a predetermined distance, at least comprising their position and/or distance to the piece good of the state vector, wherein in case of a smaller number than the predetermined number of nearest adjacent piece goods, the state vector is assigned default values; and/or velocity and/or size of the piece goods; and/or global state information of the conveyor system, for example comprising a number of piece goods on the conveyor system, average velocity of the conveyor system, prioritization of individual piece goods, for example on the basis of size and/or sorting criterion. The standard values can, for example, represent virtual, already perfectly aligned piece goods at a desired distance, so that these virtual piece goods have as little disturbing influence as possible on the control of the piece good under consideration.

The actual number of belts on which a piece good rests varies depending on the size and orientation of the piece good. However, the action vectors have a constant dimension. To solve this problem, the action vector can only describe velocities that lie under predetermined points or surface areas of the piece goods. Well suited as predetermined points are, for example, the vertices of a circumscribing rectangle and/or an approximated center of gravity. The position of the piece goods is thus abstracted and determined by a selection of support parameters which are chosen in such a way that they can be influenced by the action vectors. Thus, the actual piece goods are always described with a fixed number of parameters with regard to their support on the conveyor system. The properties of the piece goods were abstracted into model parameters which can be influenced with the action vector and whose number corresponds to the dimensionality of the action vector.

If the action vectors assigned by the agent for two or more piece goods are mapped to the same conveying element, it must be decided which value is given which priority. This conflict can be solved by performing a prioritization and/or a weighted averaging of the velocities given by the action vectors depending on the respective overlap of these piece goods with this conveying element and/or on a quality of the state vectors. The corresponding conveying element is controlled according to the result.

If two elements of the action vector of a piece good are mapped to the same conveying element, this conveying element can be controlled with a mean value of these elements or one of the elements can be preferred fully or weighted.

According to one embodiment, the image can be evaluated using image processing methods and the state vectors can be created based on the evaluated image. For example, the piece goods are simulated with circumscribing rectangles.

According to one embodiment, a first attempt to create the state vectors can be done automatically using Deep Reinforcement Learning from the image. Thus, a first or further attempt to create the state vectors can be made based on the original image. Thus, the representation of the state vectors is not predefined, but automatically learned from the (camera) image by means of Deep Reinforcement Learning; the state vectors are thus formed directly based on the pixel assignment of the digital camera image. If, on the other hand, the state vectors are determined via the intermediate step of image processing methods performed on the image, the state vectors are defined by expert knowledge; moreover, image processing errors directly affect the state vectors. If for some reason this first creation attempt for an image or part of an image is unsuccessful, an attempt can subsequently be made to evaluate the state vectors for that image or part of that image using image processing methods to obtain the state vectors.

Moreover, to obtain a more farsighted agent, the learning agent can optimize its strategy based on the comparison of the state vectors of the initial state and the subsequent state using a reward, and adjust the action vectors of the action space.

In order to provide an initial strategy for the agent with little effort, so that a customer is already supplied with a robust strategy and thus a functioning conveyor system, training of the agent's strategy for piece goods of one type can be performed with a virtual conveyor system (and thus virtual piece goods and virtual conveyor elements) or with a real conveyor system. Moreover, if a predetermined strategy is already supplied, training of the strategy during the execution of the process can be dispensed with—for example in the case of a very similar flow of piece goods or a lack of computing capacity of the IT system of the conveyor system operator.

BRIEF DESCRIPTION OF THE DRAWINGS

Embodiments of the invention are explained in more detail below with reference to the figures, for example. Thereby show.

DETAILED DESCRIPTION

Figure 1:
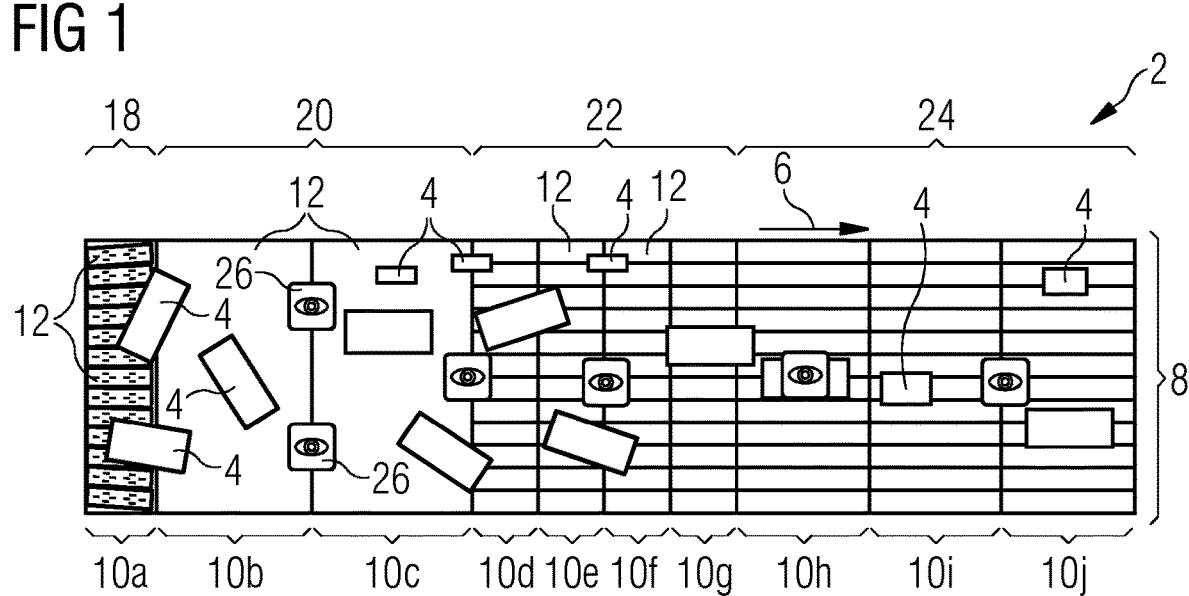
FIG. 1A shows a top view of a conveyor system.

FIG. 1 shows a corresponding conveyor system 2, which transports piece goods 4 along a main conveying direction 6 on a conveying line 8 resting on conveying means 12 with a typical field of application as singulator 2 in the postal and logistics sector. The conveying means 12 are arranged parallel to the main conveying direction 6 in segments 10 arranged one behind the other along the main conveying direction 6, aligned and along a line. The piece goods 4 are transferred for transport from one segment 10 to the respective following segment 10 and lie on several conveying means 12 at the same time and can therefore be singulated and/or rotated during their transport by individual control of the conveying means 12 by a control device not shown here, for example by operating the conveying means 12 on which the respective piece good 4 lies at a higher conveying velocity 16 than the adjacent conveying means 12. For this purpose, the control device comprises a computing unit not shown in the figure. The conveyor system 2 comprises a plurality of sensors 26 arranged above and along the conveyor path and designed as optical detectors, but in principle other types of sensors can also be attracted as long as the computing unit is able to generate the state vectors of the piece goods 4 on the basis of the sensor input. A single sensor 26 can in principle already be sufficient if the viewing angle is good.

The conveyor system 2 is subdivided into segments 18, 20, 22, 24 performing essentially different tasks along the main conveying direction 6. First, on an expansion device 18, an attempt is made to achieve an expansion of the piece goods distribution on the basis of the arrangement of the conveying elements 12. Subsequently, transport along the main conveying direction 6 is performed solely on a transfer conveyor 20. The transfer conveyor 20 comprises two segments 10b, 10c, each of which comprises only a single conveying means 12 spanning the entire width of the conveyor line 8. For a particularly efficient correction of the alignment, the segments 10d-10h or its conveying means 12 are relatively short in the alignment section 22.

For a particularly efficient correction of the distance, the segments 10d-10h or its conveying means 12 in the distance correction section 24 are longer than those of the alignment section 22. It is possible to divide the sections 22, 24 of the conveyor system 2 into sub-conveyor systems with different strategies (higher reward for good alignment in the alignment section 22 or for well-adjusted distances in the distance correction section 24), so that in each case a strategy optimized or optimizable for the respective section 22, 24 is used. However, this procedure of dividing into different sections 22/24 is mainly suitable for conveyor systems 2 which proceed without methods of Reinforcement Learning. According to one embodiment, a reward is also awarded on the basis of a comparison of the state vectors of initial and subsequent state $S_n(t)$, $S_n(t+\Delta t)$ in order to achieve an even better and faster optimization of the strategy.

Figure 4:
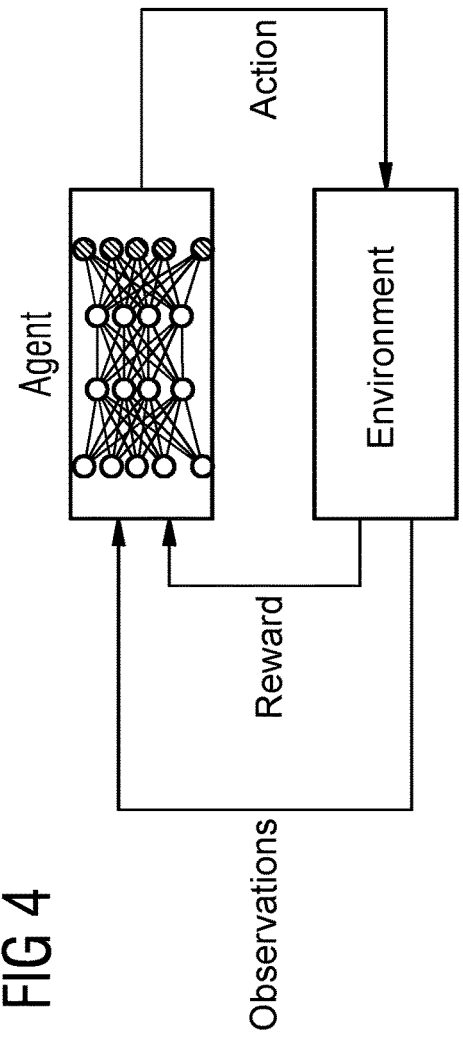
FIG. 4 is the principle of a Reinforcement Learning system.

The optimal control behavior of the control device of the conveyor system 2 is machine-learned by means of Reinforcement Learning (FIG. 4). Here, an "agent" interacts with the environment, which can be either a concrete plant as conveyor system 2, its simulation/digital twin or a data-driven learned model ("surrogate model") of the plant 2 or simulation. The actions used to influence the environment are the velocities v of all conveyor elements 12 (e.g., conveyor belts) and are represented as available motor actions in action vectors $a_n(t)$ with typically lower dimensionality than the number of conveyor elements 12. Observations available to the agent as input data are images of the conveyor system, in particular based on cameras 26 and/or other sensor data, and are represented in state vectors $S_n(t)$. If the state vector $S_n(t)$ of a piece good 4 already has the desired orientation and sufficient distance to its adjacent piece goods 4', the action vector will map a simple onward transport in conveying direction 6. The behavior of the agent is optimized based on a reward (reward) signal, which is used to describe the goodness of the current situation. Essentially, the goodness is determined by the position/orientation and the mutual distances of the packages 4. For example, the reward value is high if the packages 4 have a defined target distance from each other and lie at a certain angle on the conveyor system 2 or its conveyor elements 12. Furthermore, power consumption, lifetime consumption, noise emissions, etc. can also be considered as rewards.

Since the methods of Reinforcement Learning, in particular by a neural network or a recurrent neural network, including determination of the system model is known, a more detailed description is omitted here. The common methods (e.g. NFQ, DQN, Proximal Policy Optimization), can be used in principle for the invention.

According to one embodiment, the piece goods 4 on the image are assigned to a first and at least one further type depending on properties of the piece goods 4. An agent will provide a separate strategy for each assigned piece goods type. If only one strategy is used for all piece goods 4, no assignment needs to be performed.

The assignment of the piece goods 4 to a type is done depending on the characteristics of the piece goods. The assignment can be made on the basis of the image or can be determined beforehand (e.g. at a sorting station), in which case the individual piece goods must be tracked precisely during the process so that the assignment to a piece good type is not lost. Possible characteristics determining the assignments to a piece good type can be category (parcels, packages, large letters, . . . ), packaging material (cardboard or plastic), weight (as it influences the adhesion to the conveyor elements), size (determines on how many conveyor elements a piece good rests) . . . . The conveyor system determines the type of piece goods 4, e.g. based on the image or based on further sensors, and then assigns a separate strategy to each assigned piece good type, e.g. strategy one for heavy cardboard packages and strategy two for light cardboard packages, strategy three for heavy plastic bag packs, strategy four for light plastic bag packs, as well as any additional strategies for further piece good types.

Figure 2A:
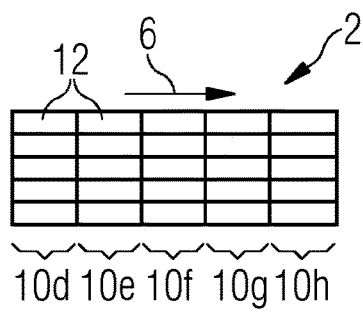
FIGS. 2A-2C show a selection of possible arrangements of the conveying elements.
Figure 2B:
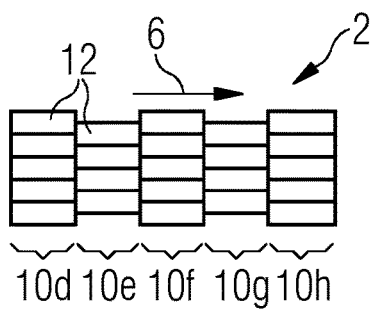
Figure 2C:
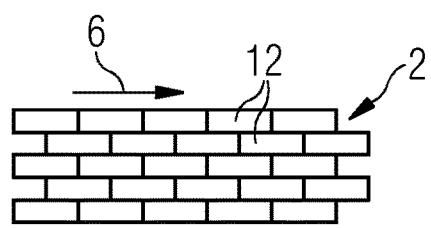

FIGS. 2A-2C show non-exhaustive possible arrangements of the conveying elements 12 of the conveying system 2. In FIG. 2a, all conveying elements 12 are arranged in a net-like matrix. This form is the easiest to describe and also the mapping of an action vector $a_n(t)$ onto the real conveying elements 12 is particularly uncomplicated in this way and always results in a comparable effect by the controlled conveying elements 12 as with a different arrangement. The conveying elements 12 in FIG. 2b are offset in segments transversely to the conveying direction 6, so that two adjacent conveying elements 12 each end in a conveying element 12. And in FIG. 2c, the conveying elements 12 arranged one behind the other along the conveying direction 6 each form continuous conveying sections which are each offset with respect to their conveying elements 12. The arrangement of FIGS. 2b, 2c can, however, offer advantages in particular for smaller piece goods 4 of a package stream which otherwise rest on only one conveying element 12.

In a conveyor system 2 operated with the method according to the invention, a design of equal length of all conveyor elements 12 without a division into sections 22/24 (FIG. 2a) is advantageous, since in this way all conveyor elements 12 are of equal length and thus piece goods 4 are manipulated in the same way over the entire area.

Figure 3:
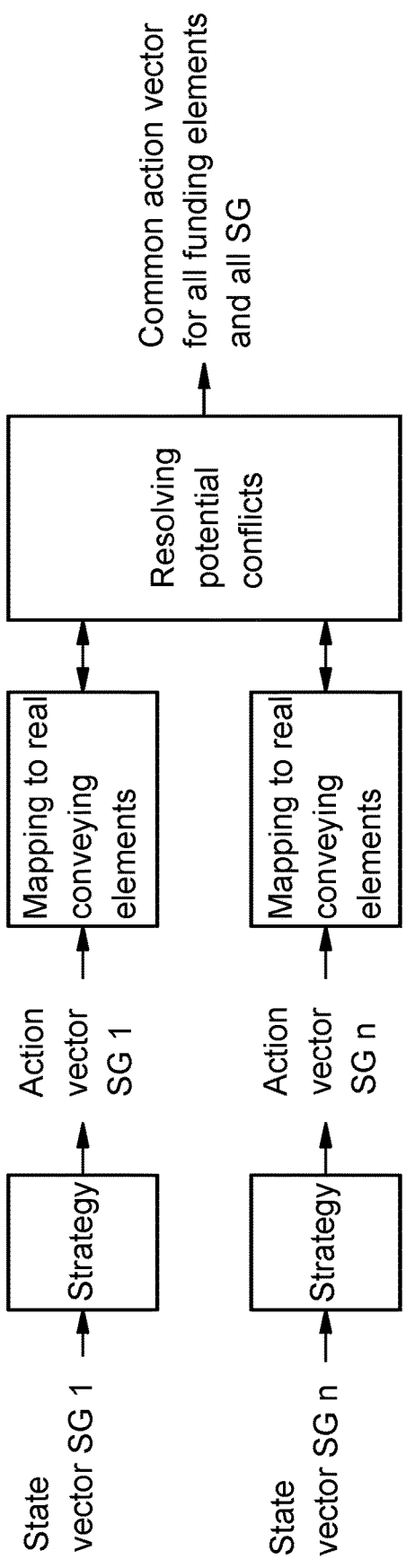
FIG. 3 is a flowchart for determining the action vector.

FIG. 3 shows a flow chart for the determination of the action vector a(t) according to the invention. Since a belt velocity from a continuous range (e.g. between 0.1 m/s and 3.5 m/s) must be set for each conveyor element 12, the action space is a subset of $R^{\wedge}85$ for, for example, 85 conveyor elements, which is far above the complexity that can be learned with known methods (e.g. because in general the number of required training examples increases exponentially with the dimensionality of the data spaces).

Therefore, a state vector s(t) is not created for the entire conveyor system 2, but an individual state vector $S_1(t)$, $S_n(t)$ is created for each piece good $4_1$, $4_n$ based on an image of the sensor 26. The state vectors $S_1(t)$, $S_n(t)$ are constructed such that it has the same dimensionality for each piece—good $4_1$, $4_n$. This means that in particular the number of considered adjacent piece goods 4' remains constant, for example by being limited to the nearest two or three piece goods at a predetermined distance. Piece goods 4 further away are irrelevant for the orientation and spacing of this piece good 4 and need not be considered. This constraint gives a state vector $S_n(t)$ of constant magnitude regardless of the actual number of piece goods 4. In case the total number of actually adjacent piece goods 4' is smaller than the number of considered adjacent packages, the corresponding state information of the state vector $S_n(t)$ can be filled with standard values. Here, for example, values are suitable which originate from so-called virtual piece goods 4' with sufficient distance and perfect alignment on the belt. The values of the virtual piece goods 4' should be selected in such a way that they have as little influence as possible on the control of the considered piece good $4_n$.

Figure 5:
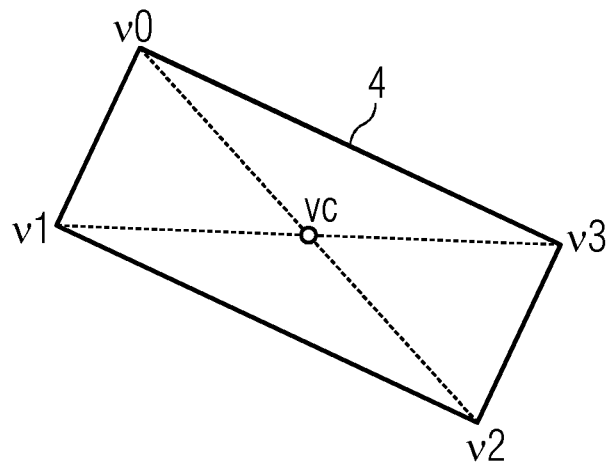
FIG. 5 shows a piece good with corner points and estimated center of gravity.
Figure 6:
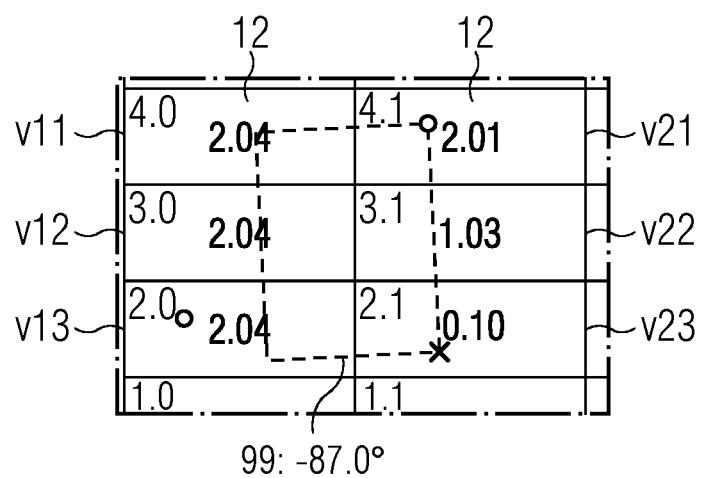
FIG. 6 exemplifies certain velocities of the conveying elements on which a piece of material rests.

In order to suitably reduce the action space, only a subset of conveyor elements 12 is used for each piece goods $4_n$. This is possible in principle, since from the point of view of an individual piece good $4_n$ at a time t not all conveying elements 12 are relevant, but only a subset of the conveying elements 12, in particular those on which the piece of material $4_n$ lies. However, depending on the size and orientation of the piece goods $4_n$ and the conveyor elements 12, the number of relevant conveyor elements 12 varies. For machine learning, however, the action vectors $a_n(t)$ must have a constant dimensionality. Thus, the dimension of the action vectors $a_n(t)$ is smaller than the number of conveying elements 12 of the entire conveying system 2 to achieve a reduction of the dimensionality of the overall problem. For this purpose, a suitable abstraction must be found. For example, the action vector $a_n(t)$ per piece good $4_n$ can be chosen to include only certain conveying elements 12, e.g. those under the corner points $v_1$, $v_2$, $v_3$, $v_4$ of a piece 4 as well as under its (estimated) center of gravity $V_c$, (FIG. 5). In FIG. 6, a 5-dimensional action vector $a_n(t)$ would be given by the belt velocities $v_{21}$, $v_{11}$, $v_{13}$, $v_{23}$ (2.01, 2.04, 2.04, 0.10) [m/s] under the 4 vertices as well as by the belt velocity $v_s$ (2.04 m/s) below the center of gravity.

An alternative representation of the action vector $a_n(t)$ would be the division of the base area of the piece goods $4_n$ or a circumscribing rectangle into a fixed number of zones, wherein each zone is described by a velocity $v_i$. Alternatively, the action vector $a_n(t)$ may describe a velocity vector of the piece goods $4_n$. The representation of the action vector $a_n(t)$ is in any case independent of the actual conveying elements 12, but determines their control in the further course of the process.

Reinforcement Learning methods use a strategy function (policy) that maps a state vector $S_n(t)$ to an action vector $a_n(t)$ of the action space, i.e. the strategy function chooses appropriate belt velocities depending on the respective situation mapped in the state vector $S_n(t)$. The strategy function is usually represented by a machine-learned model (neural network, Gaussian process, random forest, parameterized equations, etc.). Mapping the chosen action vector $a_n(t)$ to the real conveying elements 12 influences the subsequent state $S_n(t+\Delta t)$ of the piece goods. To train the strategy, a reward is given based on the subsequent state $S_n(t+\Delta t)$, based on which the agent adjusts the action vectors of the action space and thus improves the strategy. It is possible to additionally award a reward for a comparison of the subsequent state $S_n(t+\Delta t)$ with the initial state $S_n(t)$ or with states $S_n(t-\Delta t)$, $S_n(t-\Delta t)$, . . . further back in time. This isolated comparison of the subsequent state with the previous state or with more than just the immediately previous state and/or the isolated evaluation of the subsequent state $S_n(t+\Delta t)$ combined with an evaluation quantified with rewards allows the strategy model to be adjusted.

The strategy model is thus improved so that in the future, for the initial state $S_n(t)$, even more suitable action vectors $a_n(t)$ are selected and mapped onto the real conveyor system 2. However, it is also possible to optimize the strategy in advance with a real or virtual conveyor system according to the described procedure and to simply apply this already predetermined strategy to the individual state vectors $S_n(t)$ during the control of the conveyor system 2.

Thus, on the one hand, it is possible to optimize the strategy and thus the selection of the action vectors $a_n(t)$ for each piece good 4, $4_n$ during the operation of the plant 2 (i.e., the strategy continues to learn or train during the execution of the process). Alternatively, the strategy can be trained and predetermined in advance using training data (e.g., historical data of the operation of the plant using the "standard control"), with the same or a comparable plant 2 and different piece good occupancy, or using a simulation of the plant 2. On the one hand, this predetermined strategy can be used as a predetermined "initial strategy" and this predetermined strategy is then further trained and thus optimized during the execution of the process. Or, on the other hand, this predetermined strategy is simply applied to the states of the piece goods $4_n$ mapped in the state vectors $S_n(t)$ during the runtime without further optimization—the strategy is then no longer changed during the runtime.

Since the location coordinates of the piece goods 4 and the conveyor elements 12 are known, the states of the piece goods 4 can be mapped from the real world into state vectors $S_n(t)$ of the virtual world. For each piece good 4 individually, an action vector $a_n(t)$ is selected based on its state vector $S_n(t)$ using a strategy in the virtual world. This action vector $a_n(t)$ can in turn be mapped back to the conveying elements 12 of the real conveyor system 2, so that these conveying elements 12 are controlled at the mapped velocities of the action vector $a_n(t)$, whereupon the piece good 4 and the entire conveyor system 2 are transferred to a subsequent state. Each time after a cycle time $\Delta t$ has elapsed, this process is evaluated on the basis of a reward, which improves the strategy. This process is carried out for each piece good 4 in the area of the image until the piece good 4 has left the area of the image.

After each cycle time $\Delta t$ has elapsed, i.e. essentially at the same time as the velocities v of those conveying elements to which an action vector $a_n(t)$ has been mapped are determined, the velocities of those conveying elements 12 are determined to which, however, the action vector $a_n(t)$ has not been mapped. The velocities of these conveying elements 12 are determined and controlled by the control device according to this determination.

This concerns the conveying elements 12 on which the piece good $4_n$ rests but to which no action vector $a_n(t)$ of this piece goods $4_n$ has been mapped. The velocities v of these conveying elements 12 are determined by interpolation, e.g. bilinear interpolation, of the velocities v of those adjacent conveying elements 12 to which an action vector $a_n(t)$ of this piece good $4_n$ has been mapped.

In addition, this concerns those conveying elements on which no piece goods $4_n$ rest as well as on which no action vector $a_n(t)$ of a piece good $4_n$ has been mapped. The velocities v of these conveying elements 12 can be determined according to one of the following approaches, which can also be combined with each other:

Via interpolation of the velocities v of those adjacent conveyor elements 12 to which an action vector $a_n(t)$ of a piece good $4_n$ has been mapped. Special boundary conditions can be assumed for edge conveyor elements 12. The velocities v are determined based on velocity parameters of the conveyor system 2 (standard values from installation or simulation, e.g. mean value of all action vector conveyor elements). The velocity v from the conveyor elements 12, on whose adjacent conveyor elements 12 the action vector $a_n(t)$ of a piece good $4_n$ has been mapped, are chosen to match the velocity of this adjacent conveyor element 12. Potential conflicts may arise in this regard and may be resolved by, for example, prioritization and/or weighted averaging. The velocities for some or all of these conveyor elements 12 may be identical and determined from the average of the velocities of the conveyor elements 12 onto which an action vector $a_n(t)$ of a piece of material $4_n$ has been mapped.

An essential advantage of the method according to the invention is that the strategy is trained from the point of view of one piece good $4_n$ at a time for all future piece goods 4 (and for future states of this same piece good $4_n$) and is also used as a common, shared strategy for all piece goods 4. The same strategy model is thus applied to each piece good 4, $4_1$, $4_n$ and calculates an individual, local action vector $a_1(t)$, $a_n(t)$ based on the individual state vector $S_1(t)$, $S_n(t)$ in each case.

Figure 7:
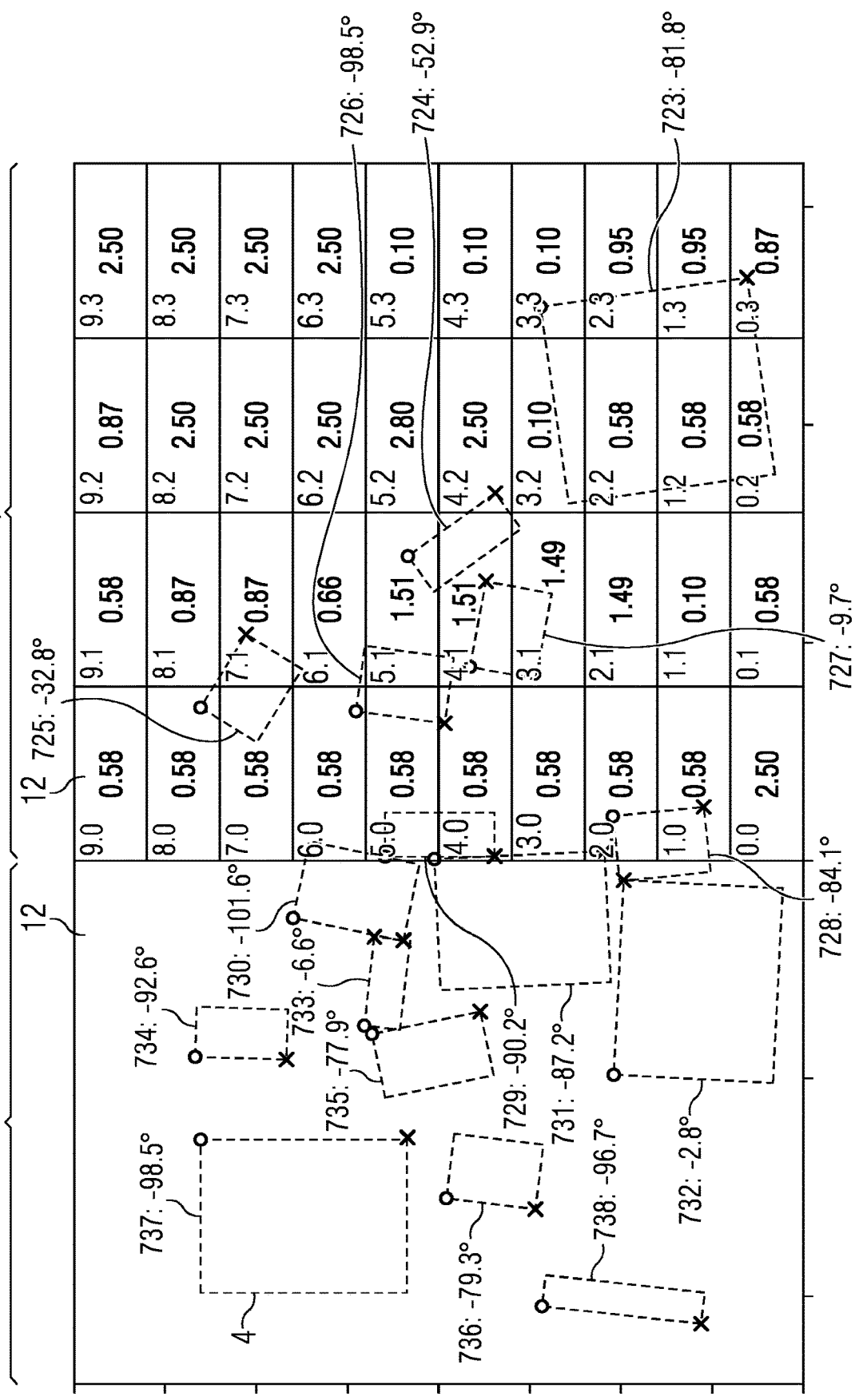

The action vectors $a_1(t)$, $a_n(t)$ are then mapped to the real conveying elements 12 as a global band matrix (comprising all conveying elements 12). Intermediate conveyor elements 12 are given suitably interpolated values (e.g. via bilinear interpolation). When mapping to the real belt matrix, conflicts may arise, i.e. more than one package 4 addresses the same conveying element 12. These conflicts, several of which are shown in FIG. 7, are resolved by prioritizing and/or weighted averaging depending on the overlap of the piece goods 4 with the conveying element 12 and package state. For example, a package 4 with little overlap receives a small weight of the velocity of its action vector a(t) projected onto the conveying element 12 in the averaging. An appropriate logic can be given via expert knowledge or can be learned by machine. The overlap of each piece good 4 with its conveying elements 12 can be mapped in the state vector $S_n(t)$ or otherwise.

Training of the strategy function can be performed using real or simulated data. In particular, the training at the customer's site can be continued in operation, which allows the conveyor system to automatically adapt to changing characteristics of the package flow (size, weight, shape, and material of the packages).

According to one embodiment, the state vector $S_n(t)$ of a piece good $4_n$ may comprise one or more of the following information: State information of the respective package 4 (and adjacent packages 4') such as positions, velocities, orientation, . . . . Global information about the state of the conveyor system 2: number of packages 4, average velocity v, prioritization by the user, . . . .

LIST OF REFERENCE SIGNS

2 Conveyor system
4 Piece goods
6 Conveying direction
8 Conveyor line
10 Segment
12 Conveying means
18 Expansion device
20 Transfer conveyor
22 Alignment section
24 Distance correction section
26 Sensor
V Velocity
a(t) Action vector
s(t) State vector
$\Delta t$ Cycle time

The invention claimed is:

1. A computer-implemented method for controlling a control device of a conveyor system for transporting piece goods of at least one type including mail items and pieces of luggage, wherein the conveyor system has a plurality of conveyor elements aligned along and parallel to a conveying direction, the conveyor elements being driven, under control of the control device, by a respectively assigned drive at an individually adjustable velocity to achieve an alignment and/or a defined spacing of the piece goods, wherein the activation of the control device is determined by at least one agent acting or predetermined according to methods of Reinforcement Learning, which agent, in accordance with a strategy, situationally selects an action from an action space for an initial state in order to reach a subsequent state, wherein the initial state and the subsequent state are mappable with state vectors and the actions are mappable with action vectors, the method comprising the process steps:

a) creating an output image of the conveyor system;
b) for each of the piece goods on the image, individually creating a state vector of predetermined dimension and of the same dimension for all piece goods of one type, comprising state information of the respective item taken from the immediately previously created image;

c) for each piece good individually selecting an action vector from an action space according to the strategy, which is the same for all piece goods of a kind, for the current state vector of each piece good, the dimension of the action vector being predetermined;

d) for each piece good mapping the action vector onto the conveying elements of each piece good to determine the velocity of these conveying elements, and corresponding control of the conveying elements with the control device;

e) creating of a sequential image of the conveyor system and performing process step b) to obtain a state vector of the subsequent state for each piece good after a cycle time has elapsed;

f) if the strategy for piece goods of one type is to be trained further during the execution of the method, the state vector of the subsequent state is evaluated for each piece good of this kind by a method of Reinforcement Learning on the basis of a reward, whereupon the agent trains and thus optimizes the strategy for piece goods of this kind by adjusting the action vectors of the action space; and g) for each piece good, carrying out the process steps c)-f) again using the improved or predetermined strategy as long as the piece good concerned is shown on the subsequent image.

2. The method according to claim 1, further comprising the step of assigning the piece goods on the image to a first and at least one further type depending on properties of the piece goods and for each assigned type providing an agent with a strategy for piece goods of this kind.

3. The method according to claim 2, further comprising the step of determining for each cycle time and for each piece good the velocities of those conveying elements on which the piece good rests but onto which no action vector an of this piece good has been mapped, and corresponding individual control of these conveying elements with the control device, wherein the velocities are determined by interpolation of the velocities of those adjacent conveying elements onto which an action vector of this piece goods has been mapped.

4. The method according to claim 3, further comprising the step for each cycle time of determining the velocities of all those conveying elements on which both no piece goods rests and on which no action vector of a piece good has been mapped, and corresponding individual control of just these conveying elements with the control device, wherein:
 the velocities are determined by interpolation of the velocities of those adjacent conveying elements to which an action vector of a piece good has been mapped; and/or
 the velocities are determined on the basis of velocity parameters of the conveyor system; and/or
 the velocity of the conveying elements on whose adjacent conveying elements the action vector of a piece good has been mapped, be selected to match the velocity of that adjacent conveyor element; and/or
 the velocities for some or all of these conveying elements are identical and are determined from the mean value of the velocities of the conveying elements onto which an action vector of a piece good has been mapped.

5. The method according to claim 4, wherein the state information of a piece good mapped in the state vector comprises position and/or orientation of the piece good.

6. The method according to claim 5, wherein the state information of a piece good mapped in the state vector or otherwise comprise:
 overlap of the piece good with those conveyor elements on which the piece good rests; and/or
 state information of a predetermined number of nearest adjacent piece goods within a predetermined distance, at least comprising their position and/or distance to the piece good of the state vector, wherein in the case of a smaller number than the predetermined number of nearest adjacent piece goods, the state vector is assigned default values; and/or
 velocity and/or size of the piece good; and/or
 global state information of the conveyor system comprising a number of piece goods on the conveyor system, average velocity of the conveyor system, prioritization of individual piece goods, for example based on size and/or sorting criterion.

7. The method according to claim 6, wherein the action vectors describe only velocities that lie under predetermined points or surface areas of the piece good.

8. The method according to claim 1, wherein if the action vectors, assigned to two or more piece goods are mapped onto the same conveying element, prioritization and/or weighted averaging of the velocities specified by the action vectors, an is carried out as a function of the respective overlap of these piece goods with this conveying element and/or of a quality of the state vectors; and/or if two elements of the action vector of a piece good are mapped onto the same conveying element, this conveying element is controlled with an mean value of these elements or one of the elements is given full or weighted preference.

9. The method according to claim 1, wherein the image is evaluated with image processing methods and the state vectors are created based on the evaluated image.

10. The method according to claim 1, wherein a first generation attempt of the state vectors is performed automatically via Deep Reinforcement Learning from the image.

11. The method according to claim 1, further comprising the step of training the strategy of the agent for piece goods of a kind with a virtual or real conveyor system.

12. The method according to claim 1, further comprising the step of determining for each cycle time and for each piece good the velocities of those conveying elements on which the piece good rests but onto which no action vector an of this piece good has been mapped, and corresponding individual control of these conveying elements with the control device, wherein the velocities are determined by interpolation of the velocities of those adjacent conveying elements onto which an action vector of this piece goods has been mapped.

13. The method according to claim 1, further comprising the step for each cycle time of determining the velocities of all those conveying elements on which both no piece goods rests and on which no action vector of a piece good has been mapped, and corresponding individual control of just these conveying elements with the control device, wherein:
 the velocities are determined by interpolation of the velocities of those adjacent conveying elements to which an action vector of a piece good has been mapped; and/or
 the velocities are determined on the basis of velocity parameters of the conveyor system; and/or
 the velocity of the conveying elements on whose adjacent conveying elements the action vector of a piece good has been mapped, be selected to match the velocity of that adjacent conveyor element; and/or the velocities for some or all of these conveying elements are identical and are determined from the mean value of the velocities of the conveying elements onto which an action vector of a piece good has been mapped.

14. The method according to claim 1, wherein the state information of a piece good mapped in the state vector comprises position and/or orientation of the piece good.

15. The method according to claim 1, wherein the state information of a piece good mapped in the state vector or otherwise comprise:
- overlap of the piece good with those conveyor elements on which the piece good rests; and/or
- state information of a predetermined number of nearest adjacent piece goods within a predetermined distance, at least comprising their position and/or distance to the piece good of the state vector, wherein in the case of a smaller number than the predetermined number of nearest adjacent piece goods, the state vector is assigned default values; and/or
- velocity and/or size of the piece good; and/or
- global state information of the conveyor system comprising a number of piece goods on the conveyor system, average velocity of the conveyor system, prioritization of individual piece goods, for example based on size and/or sorting criterion.

16. The method according to claim 1, wherein the action vectors describe only velocities that lie under predetermined points or surface areas of the piece good.

17. A device for data processing for computer-implemented control of the control device of the conveyor system for transporting the piece goods of at least one type, wherein the plurality of conveyor elements are aligned along and parallel to a conveying direction, and wherein the conveyor elements are aligned under the following conditions: control of the control device are driven by a respectively assigned drive with individually adjustable velocity in order to achieve an alignment and/or a defined spacing of the piece goods, wherein the control of the control device is determined by at least an agent which acts according to the Reinforcement Learning methods and which, in accordance with a strategy for piece goods of one type, situationally selects an action from the action space for the initial state in order to reach the subsequent state, wherein the initial state and the subsequent state can be mapped with the state vectors and the actions can be mapped with the action vectors, wherein for the piece goods on the conveyor system are detected by at least one sensor and the control device comprises a computing unit that configured to carry out the method according to claim 1.

18. A conveying system for transporting the piece goods of at least one type, wherein the conveying elements are driven under the control of the control device by a respectively associated drive at an individually adjustable velocity in order to achieve an alignment and/or a defined spacing of the piece goods, wherein the control of the control device is determined by the agent acting according to methods of the Reinforcement Learning, which agent, in accordance with a strategy which is the same for all piece goods of one type, situationally selects the action from the action space for the initial state in order to reach the subsequent state, wherein the initial state and the subsequent state are represented with the state vectors and the actions are represented with the action vectors, wherein the conveyor system comprises a device according to claim 17.

19. A computer program comprising instructions which, when executed by the computing unit connected to the conveyor system according to claim 18.

* * * * *